Nov. 24, 1925.

M. J. SOMERS 1,563,047

SAND RIDDLE

Filed May 9, 1925

WITNESSES

INVENTOR
M. J. Somers.
BY
ATTORNEYS

Patented Nov. 24, 1925.

1,563,047

UNITED STATES PATENT OFFICE.

MITCHELL J. SOMERS, OF SPRINGFIELD, OHIO.

SAND RIDDLE.

Application filed May 9, 1925. Serial No. 29,169.

*To all whom it may concern:*

Be it known that I, MITCHELL J. SOMERS, a citizen of the United States, and a resident of Springfield, in the county of Clark and State of Ohio, have made certain new and useful Improvements in Sand Riddles, of which the following is a specification.

My present invention relates generally to sand screens, and more particularly to what are commonly known as sand riddles, especially in foundry use and whose effectiveness depends upon the speed and efficiency with which sand may be screened. Ordinarily flat screens are employed within frames, although it has been proposed to annularly corrugate the screen in order to increase its efficiency. Both constructions, however, necessitate crossing stay or supporting rods in the frames thereof, while my invention has for one of its many objects the provision of a construction which not only avoids the necessity of such rods, but also permits of substantially increased speed and efficiency in the screening operation.

For a further object my invention proposes a screen having substantial advantages in speed and efficiency of operation which may be produced without increased cost as compared to the ordinary screen.

Generally speaking, my invention proposes a screen which has continuously spaced, though regularly contiguous upset portions of such nature as to leave flat portions of the screen between them and to form with said flat portions relatively sharp angles, and also of such a nature that each of said upset portions presents a plurality of faces and a plurality of relatively sharp angles between such faces.

In the accompanying drawing which illustrates my present invention and forms a part of this specification:—

Figure 1:
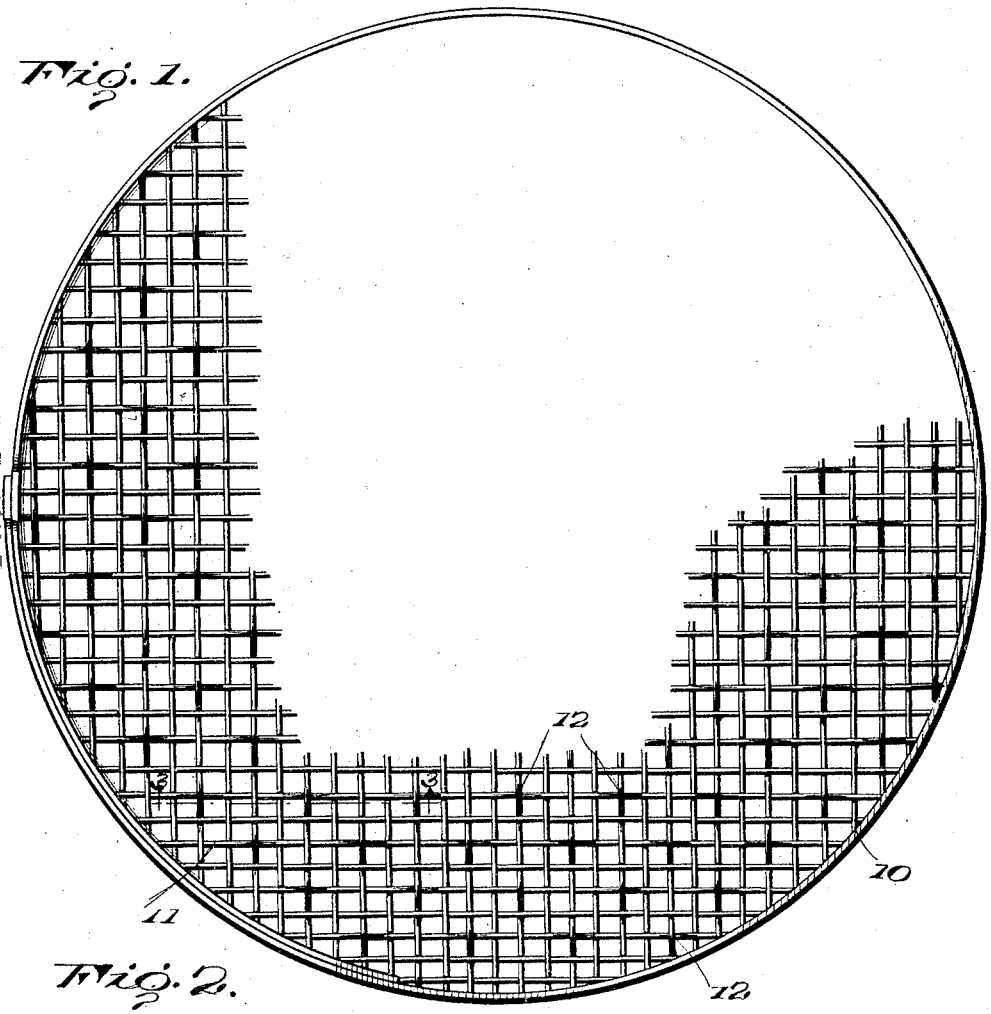
Figure 1 is a top plan view of a sand riddle embodying the screen as proposed by my invention.

Referring now to these figures, and particularly to Fig. 1, I have shown a sand riddle including a circular frame 10, within and across which the screen 11 is secured, in the present instance without additional support, such as crossing stay or supporting wires usually necessary.

Figure 2:
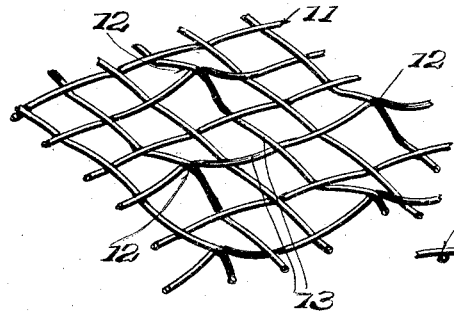
Figure 2 is a fragmentary perspective view of the screen showing the same on an enlarged scale; and, Figure 3 is an enlarged detailed section taken substantially on line 3—3 of Fig. 1.
Figure 3:
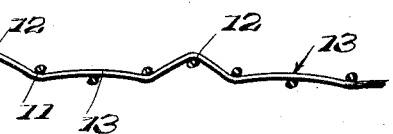

As shown more particularly in Figs. 2 and 3, the screen 11 in accordance with my invention, is provided with a plurality of spaced apart regularly arranged and contiguous upset portions 12, each of which is specifically of pyramidal form. These several upset pyramids are so arranged as to leave flat portions 13 of the screen between the pyramids, so that in the screening action every portion of the entire screen comes substantially into uniform action and the lumpy portions of the material become readily broken up in the shaking movements of the riddle, irrespective of whether such movement is entirely a lateral movement or more or less rotary.

Moreover in the construction shown it will be particularly noted from Figs. 2 and 3 that the upset pyramids form between the same and the flat portions of the screen, a plurality of relatively sharp angles so that in the shaking movements of the screen the sand will be caused to impinge against or strike the various flat faces of the pyramids and all lumpy particles will in this way become readily broken up, more especially when the sand is in a moist condition ordinarily difficult to effectively screen.

Still again, it will be noted that by virtue of its particular shape, each of the upset portions presents a series of flat faces and a series of relatively sharp angles between these flat faces so that there is no point throughout the area of the screen where the sand may collect as in the before-mentioned annularly corrugated screen.

As compared to the usual flat screen my invention in doing away with the necessity of the usual crossed supporting or stay wires, eliminates a substantial item of expense in manufacture, such as to at least make up for the slight additional expense in forming the pyramids. Thus as a whole my invention may be produced without extra expense over the usual construction and will be much cheaper in the end, taking into consideration its adaptability to a much greater volume of work and the greater efficiency it presents in the screening operation.

I claim:—

A screen for sand riddles consisting of a body formed of woven wire having regularly spaced apart upset portions leaving approximately flat portions of the screen between the upset portions and forming with said flat portions relatively sharp angles, said upset portions serving the double function of breaking up sand particles and reinforcing the screen and each upset portion presenting a plurality of faces and relatively sharp angles between the faces.

MITCHELL J. SOMERS.